United States Patent
Hanussek et al.

(10) Patent No.: US 8,469,167 B2
(45) Date of Patent: Jun. 25, 2013

(54) CENTRIFUGAL CLUTCH

(75) Inventors: Sebastian Hanussek, Remseck (DE); Jörg Elfner, Waiblingen (DE); Tim Gegg, Remseck (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 295 days.

(21) Appl. No.: 12/923,492

(22) Filed: Sep. 24, 2010

(65) Prior Publication Data

US 2011/0073435 A1 Mar. 31, 2011

(30) Foreign Application Priority Data

Sep. 28, 2009 (DE) .......................... 10 2009 043 247

(51) Int. Cl.
*F16D 67/02* (2006.01)
*F16D 43/18* (2006.01)

(52) U.S. Cl.
USPC ...................... 192/16; 192/17 R; 192/105 BA

(58) Field of Classification Search
USPC ................. 192/14, 17 R, 105 C, 105 BA, 15, 192/16
See application file for complete search history.

(56) References Cited

U.S. PATENT DOCUMENTS

| | | | | |
|---|---|---|---|---|
| 2,916,119 | A * | 12/1959 | Den Haan et al. | 192/15 |
| 3,461,994 | A | 8/1969 | Dallman et al. | |
| 4,016,963 | A * | 4/1977 | St. John | 192/105 BA |
| 5,921,364 | A * | 7/1999 | Kobayashi | 192/105 BA |
| 7,111,715 | B2 * | 9/2006 | Omata et al. | 192/16 |
| 7,640,669 | B1 * | 1/2010 | King | 30/383 |
| 7,849,987 | B2 * | 12/2010 | Kaskawitz et al. | 192/14 |
| 2002/0078671 | A1 * | 6/2002 | Hiratsuna et al. | 56/11.8 |
| 2009/0008208 | A1 | 1/2009 | Uhl | |

FOREIGN PATENT DOCUMENTS

EP 1 224 853 7/2002
WO WO 2008/103105 8/2008

* cited by examiner

*Primary Examiner* — Richard M. Lorence
*Assistant Examiner* — Stacey Fluhart
(74) *Attorney, Agent, or Firm* — Walter Ottesen P.A.

(57) ABSTRACT

A centrifugal clutch, especially in a hand held work apparatus, such as a cut-off machine (1), a brush cutter or the like, having a rotational axis (20), at least one movably mounted centrifugal weight (25) arranged at the drive end and a clutch drum (16) arranged at the output end. The centrifugal clutch (15) includes a brake device (18) which is released by the centrifugal weight (25) when the centrifugal weight (25) moves radially outward in relation to the rotational axis (20).

18 Claims, 3 Drawing Sheets

CENTRIFUGAL CLUTCH

CROSS REFERENCE TO RELATED APPLICATION

This application claims priority of German patent application no. 10 2009 043 247.7, filed Sep. 28, 2009, the entire content of which is incorporated herein by reference.

FIELD OF THE INVENTION

The invention relates to a centrifugal clutch defining a rotational axis and having at least one centrifugal weight on the drive end of the clutch and a clutch drum at the output end of the clutch.

BACKGROUND OF THE INVENTION

It is generally known to connect the tool in hand-held work apparatus such as cutoff machines, brush cutters, chain saws or the like with the drive motor via a centrifugal clutch. This ensures that the tool does not run at low revolutions per minute such as while idling or during starting. Such a centrifugal clutch is for example disclosed in United States patent application publication 2009/0008208.

It is also known to provide a coasting brake on the tool of a hand-held work apparatus to brake the tool when the revolutions per minute or the drive torque fall below a predetermined value. This is, for example, disclosed in US 2010/0140025 A1.

SUMMARY OF THE INVENTION

It is an object of the invention to provide a centrifugal clutch of the kind described above which has a simple configuration and makes safe operation of the work apparatus possible.

The centrifugal clutch of the invention has a drive end and an output end and includes: at least one movably mounted centrifugal weight arranged on the drive end of the centrifugal clutch; a clutch drum arranged on the output end of the centrifugal clutch; the centrifugal clutch defining a rotational axis and being configured to have an engaged state and a disengaged state; a brake device having a released position and an applied position; and, the centrifugal weight being configured to hold the brake device in the released position when the centrifugal clutch is in the engaged state.

A simple configuration results because the brake device is integrated into the centrifugal clutch. Because the centrifugal clutch holds the brake device in a release position, it is ensured that the brake device is always released when torque is applied to the tool via the centrifugal clutch. Thereby, minimal wear on the brake device results.

Because the centrifugal weight releases the brake device when moving radially outwardly to engage the clutch, it can be ensured by corresponding configuration that the brake device is already released when the clutch is engaged. Advantageously, the brake device includes at least one brake element which coacts with a braking surface, wherein the brake element is lifted from the braking surface via the centrifugal weight when releasing the brake device. Thereby, the release of the brake device can easily be achieved. Advantageously, the centrifugal weight acts on the clutch drum via the brake element when the clutch is engaged. Thereby a simple configuration results. Advantageously, the brake element is spring-mounted radially inwardly and in direction of the braking surface. In the non-activated state of the clutch, the brake device is, thereby, always activated and the tool cannot rotate. Advantageously, the brake element has a brake section and a coupling section. The brake section coacts with the braking surface and the centrifugal weight acts on the clutch drum via the coupling section. As a result of the spatial separation of the functions of releasing the brake device and engaging the clutch, a simple and reliable configuration can be achieved. The coupling section and the braking section are, thereby, advantageously arranged next to each other in the axial direction of the rotational axis.

The brake element is advantageously radially movably held on the clutch drum. It is practical to provide multiple brake elements which extend over a large part of the brake surface. Thereby, the braking surface can be well utilized. A large part of the braking surface refers to at least 70%, especially more than 90% of the braking surface. A simple configuration results, when the brake elements are spring mounted via a common spring element. The spring element is, thereby, advantageously arranged on the outer periphery of the brake element. The spring element can, for example, be a spiral spring or an elastic band.

Advantageously, the centrifugal weight is at least partially movable, especially exclusively radially to the rotational axis. A partial radial movability results with pivotally mounted centrifugal weights whose pivot motion includes components in the radial direction and in the circumferential direction. An exclusively radial movability results when the centrifugal weights are guided radially to the rotational axis. The centrifugal weight is, in particular, spring-mounted radially inwardly. The centrifugal weight is, thereby, especially arranged on a radially outwardly projecting arm of a drive-end carrier.

In order to achieve a balanced arrangement, multiple centrifugal weights are advantageously provided. The centrifugal weights are, thereby, spring-mounted via tension springs. In particular, every tension spring is arranged between two centrifugal weights, which are mutually adjacent in the peripheral direction to the rotational axis. It has been shown to be especially advantageous to have three centrifugal weights which are spring-mounted by three tension springs.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
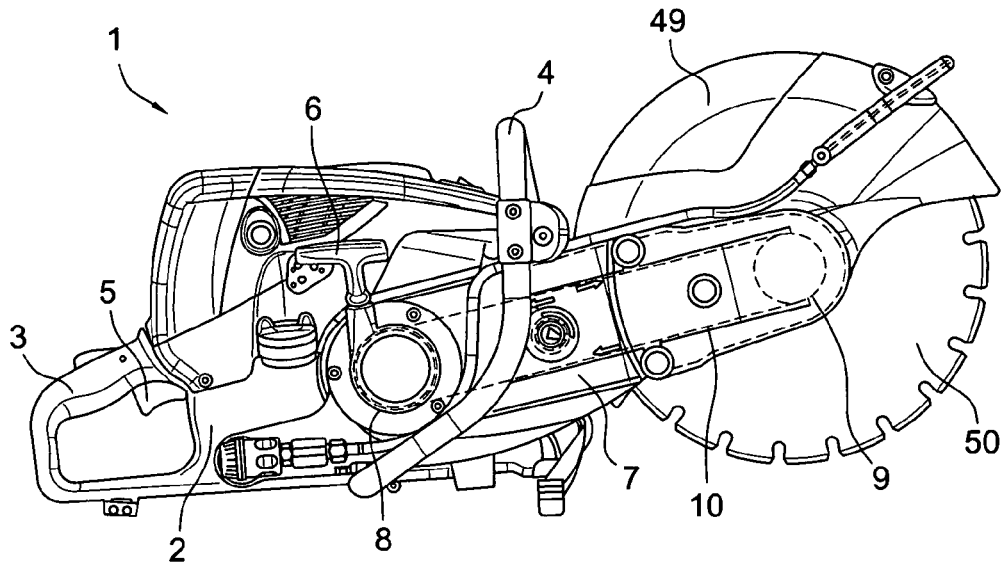
FIG. 1 is a side view of a cut-off machine.

FIG. 1 shows a cut-off machine 1 as an embodiment for a hand-held work apparatus. The cut-off machine 1 has a casing 2 on which a back handle 3 is fixed. A throttle lever 5 is pivotally mounted on the back handle 3. A grip handle 4, which overlaps the casing 2 of the cut-off machine 1, is also provided to guide the cut-off machine 1. An outrigger 7 has a cutting disc 50 arranged on its forward projecting end and is arranged on the casing 2. The cutting disc 50 is partially covered by a protective cover 49. A starter handle 6 projects outwardly adjacent to the end of the outrigger 7, which end is arranged on the casing 2. A drive belt 10 is guided inside of the outrigger 7 and is guided via a drive disc 8 arranged adjacent to casing 2 and an output disc 9 arranged adjacent to the rotational axis of the cutting disc 50.

Figure 2:
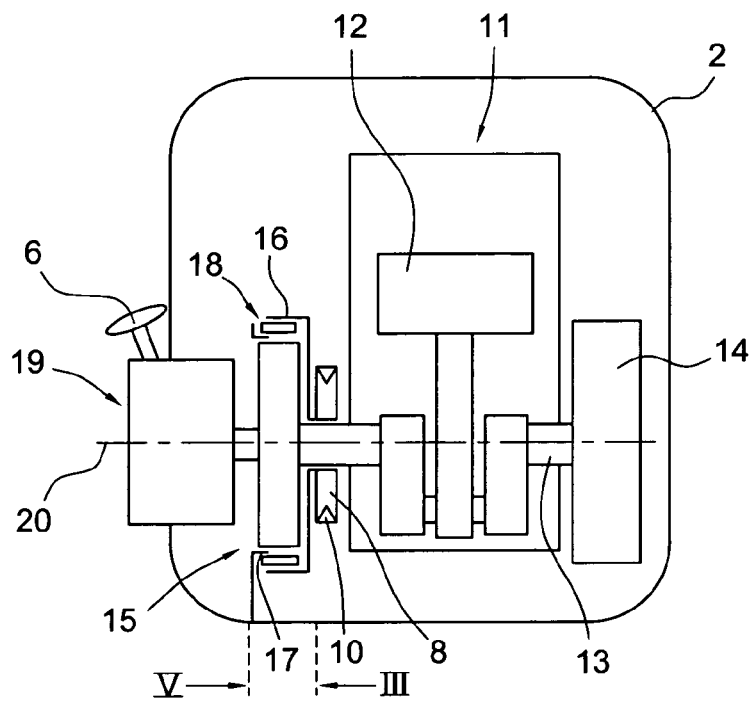
FIG. 2 is a schematic section view of the cut-off machine of FIG. 1.

FIG. 2 shows the configuration of the drive motor of the cut-off machine 1 in detail. A combustion engine 11, for example, a single-cylinder two-stroke engine or a mixture-scavenged four-stroke engine, is arranged in the casing 2 as the drive motor. The drive motor can also be an electric motor. The combustion engine 11 has a piston 12 which rotates a crankshaft 13 about a rotational axis 20. On one end of the combustion engine 11, a fan wheel 14 for the supply of cooling air for the combustion engine 11 is fixedly mounted on the crankshaft 13 so as to rotate therewith. On the opposite end, a centrifugal clutch 15 is provided.

The centrifugal clutch 15 includes a clutch drum 16, which is fixedly connected to the drive disc 8 so as to rotate therewith. The drive disc 8 is rotatably mounted on the crankshaft 13. In the embodiment, the drive disc 8 is arranged on the crankshaft 13 between the combustion engine 11 and the centrifugal clutch 15. The centrifugal clutch 15 includes a brake device 18 which coacts with a flange 17 which is arranged in a manner securely fixed to the casing. A starter device 19, which includes the starter handle 6 also shown in FIG. 1, is provided to start the combustion engine 11. The starter device 19 acts on the crankshaft 13 and rotatably drives it during the start procedure.

Figure 3:
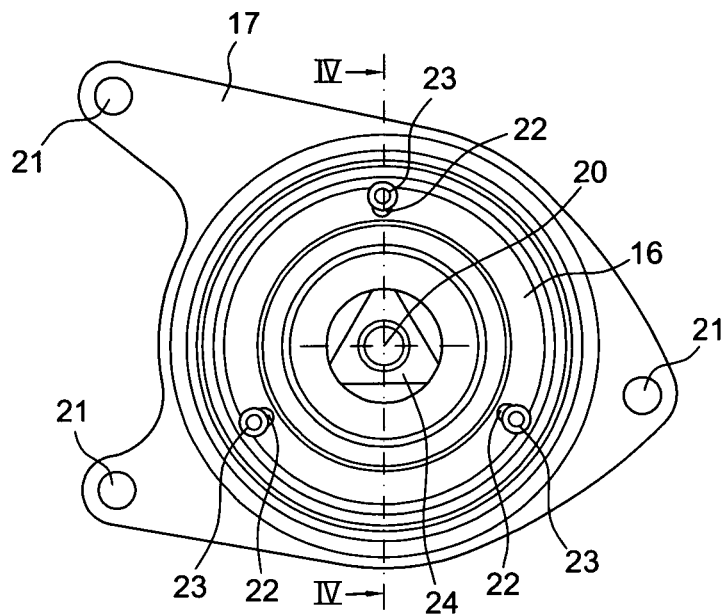
FIG. 3 is a view of the centrifugal clutch in the direction of arrow III of FIG. 2.

FIG. 3 shows a side view toward the flange 17 and the clutch drum 16. As FIG. 3 shows, the flange 17 has three attachment openings 21 for fixation on the casing 2. The clutch drum 16 has three slots 22 through which the screws 23 project.

Figure 4:
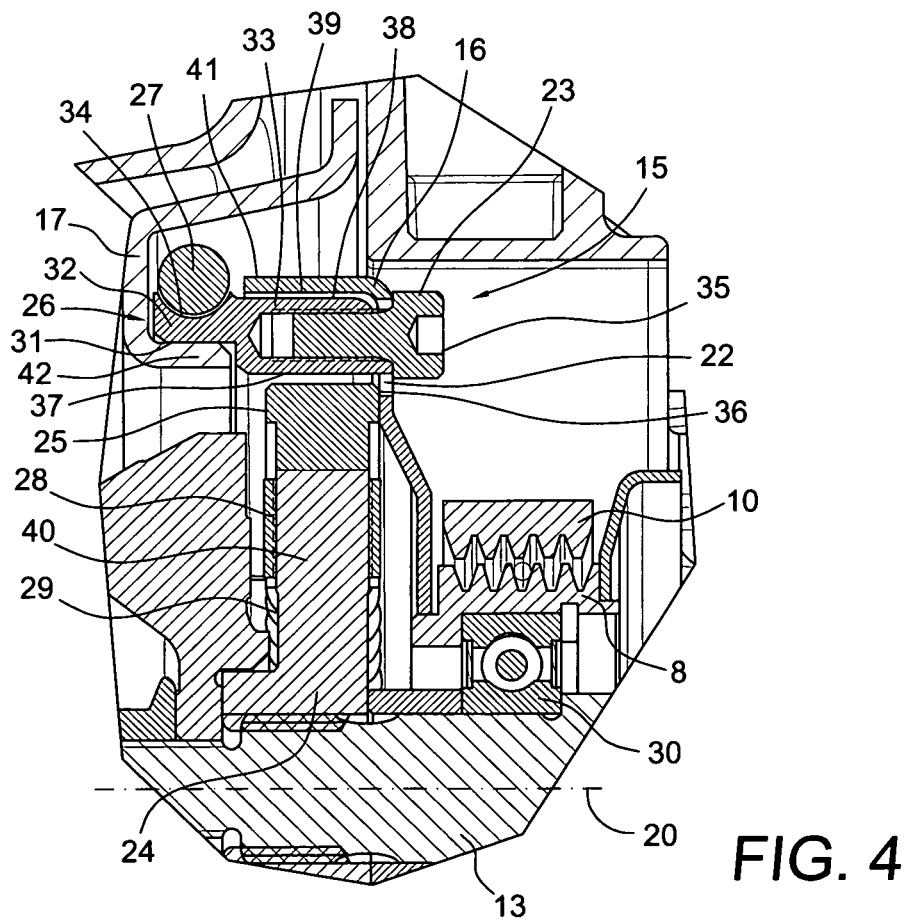
FIG. 4 is a cut-away section view through the centrifugal clutch along line IV-IV of FIG. 3.
Figure 5:
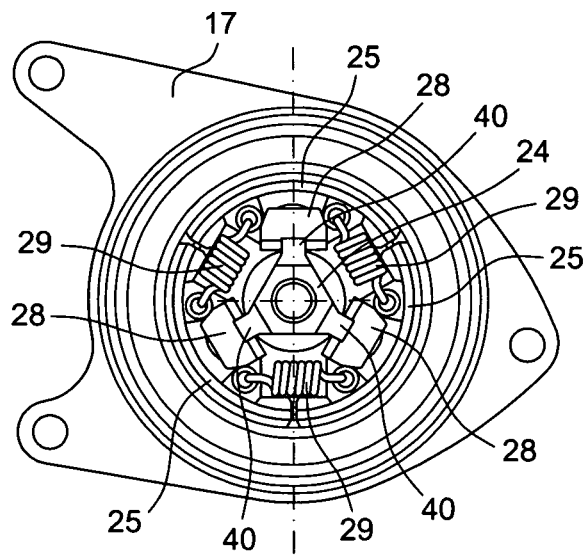
FIG. 5 is a side view of the centrifugal clutch in the direction of arrow V of FIG. 2; and, FIG. 6 is an exploded view of the centrifugal clutch.

The configuration of the centrifugal clutch 15 is shown in detail in FIG. 4. The centrifugal clutch 15 includes a carrier 24 having a total of three radially outwardly projecting arms 40 (FIG. 5). One arm 40 is shown in FIG. 4. A centrifugal weight 25 is movably mounted in a radially outward manner on each arm 40. The centrifugal weights 25 are held on the arms 40 by holders 28 in the direction of the rotational axis 20. The centrifugal weights 25 are spring-mounted radially inwardly, i.e., in a direction toward the rotational axis 20. This is shown in FIG. 5. A total of three tension springs 29 are provided which act with their ends on adjacent centrifugal weights 25 in a peripheral direction.

As FIG. 4 shows, a brake element 26 is arranged radially outside of the centrifugal weight 25. The brake element 26 is arranged in the radial direction between the centrifugal weight 25 and the rim 41 of the clutch drum 16 which extends parallel to the rotational axis 20.

As FIG. 4 shows, the brake element 26 is held radially movably with the screw 23 and is held in the slot 22 in a manner guided in the peripheral direction. The brake element 26 thereby has a radially inward-lying fixed leg 35 which projects into the slot 22 and on which the head of the screw 23 rests, so that a defined play is ensured between the brake element 26 and the clutch drum 16.

The brake element 26 has a brake section 32 and a coupling section 33. The screw 23 is screwed into the coupling section 33. The coupling section 33 extends between the centrifugal weight 25 and the rim 41 of the clutch drum 16 in the radial direction. The brake section 32 protrudes laterally out of clutch drum 16 and overlaps a rim 42 projecting laterally from the flange 17. The brake section 32 and the coupling section 33 are arranged adjacent to each other in the direction of the rotational axis 20, so that the brake elements 26 are configured as annular segments. A braking surface 31 is formed on the outer periphery of rim 42 and coacts with the brake section 32. A slot 34, in which a spring element 27 is guided, is formed on the radially outward-lying side of the brake section 32. The spring element 27 can, for example, be a coil spring or an elastic band or the like and resiliently bias all brake elements 26 radially inwardly.

The clutch drum 16 is fixedly connected to the drive disc 8 so as to rotate therewith and the drive belt 10 is guided on the drive disc 8. The drive disc 8 is rotatably mounted on the crankshaft 13 via a bearing 30, especially a rolling bearing and, in the embodiment, a ball bearing.

If the crankshaft 13 is inactive, the brake section 32 of the brake element 26 contacts the braking surface 31 of the flange 17. The brake section 32 is pressed against the braking surface 31 by the spring element 27. The drive disc 8 is held rotationally fixed because of the rotationally fixed connection of the brake element 26 to the clutch drum 16 via the screw 23. Thereby, the cutting disc 50, which is rotationally fixed to the output disc 9, is braked. As soon as the crankshaft 13 rotates, the centrifugal force acts on the centrifugal weights 25. In the case of a sufficiently high speed, the centrifugal weights 25 move radially outwardly. On their outer periphery the centrifugal weights have a friction surface 36 which, at a sufficiently high speed, becomes engaged with the inner surface 37 of the coupling section 33 of the brake element 26. When the speed predetermined by the configuration is exceeded, the centrifugal weights 25 press against the brake elements 26 and lift the brake elements 26 off the braking surface 31 against the force of the spring element 27. Upon further movement of the centrifugal weights 25 and the brake elements 26 frictionally connected to the centrifugal weights 25, the outer surface 38 of the brake elements 26, which are formed on the coupling section 83, comes into engagement with the friction surface 39 on the inter periphery of the rim 41 of the clutch drum 16 and thereby frictionally connects the centrifugal weights 25 with the clutch drum 16. Thereby, a rotationally fixed connection is effected between the crankshaft 13 and the drive disc 8. When dropping below the clutch-engaging spend which is predetermined by the configuration, at first the brake element 26 is shifted again radially inwardly and is pressed against the brake surface 31 by the spring element 27. Thereby, the cutting disc 50 is braked via the brake device 18 immediately after disengaging the clutch.

Figure 6:
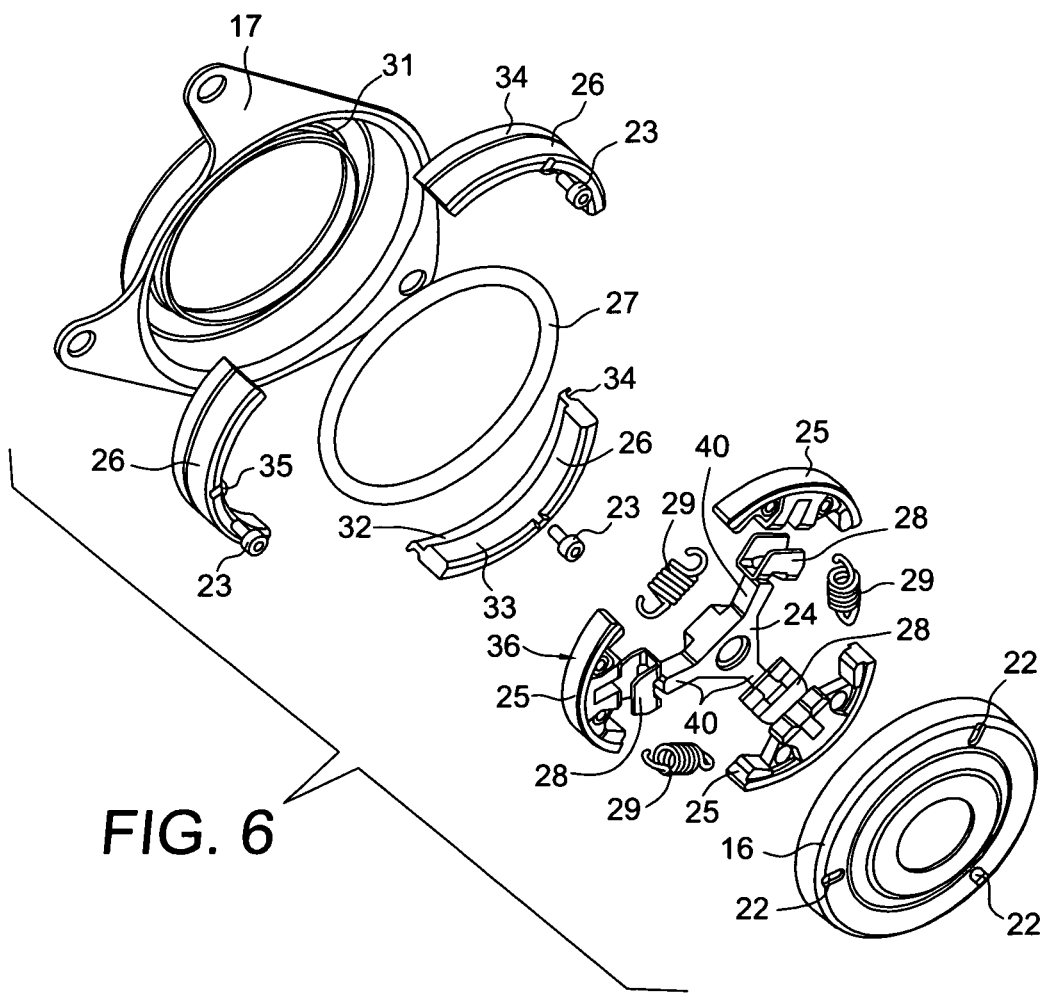

The constructive configuration is shown in detail in FIG. 6. As FIG. 6 shows, the carrier 24 has three arms 40 which project symmetrically outwardly, on each of which a holder 28 and a centrifugal weight 25 is arranged. A spring 29 is arranged between mutually adjacent centrifugal weights 25. Three brake elements 26 are provided, which essentially extend over the entire area of the braking surface 31 and thereby lead to an effective braking. The brake elements 26 thereby extend over the entire outer periphery of the friction surfaces 36 on the centrifugal weights 25.

Because the brake device 18 is disengaged from the centrifugal weights 25 when the centrifugal clutch 15 engages, it can be ensured that the cutting disc 50 is always safely braked when no drive takes place. The spring element 27 in connection with the centrifugal weights 25 and the tension springs 29 is designed such that a reliable release of the brake device 18 takes place before the centrifugal clutch 15 has fully engaged.

It can be advantageous that the brake device 18 is disengaged, for example, by a lever mechanism before it is held in the disengaged position by the centrifugal weights 25. This function can also be achieved in the same constructive configuration by arranging the weights and springs correspondingly.

It is understood that the foregoing description is that of the preferred embodiments of the invention and that various changes and modifications may be made thereto without departing from the spirit and scope of the invention as defined in the appended claims.

What is claimed is:

1. A centrifugal clutch having a drive end and an output end comprising:
   at least one movably mounted centrifugal weight arranged on said drive end of said centrifugal clutch;
   a clutch drum arranged on said output end of said centrifugal clutch;
   said centrifugal clutch defining a rotational axis and being configured to have an engaged state and a disengaged state;
   a brake device having a released position and an applied position;
   said brake device including at least one brake element;
   said centrifugal weight being configured to hold said brake device in said released position when said centrifugal clutch is in said engaged state; and,
   said brake element being held so as to be radially movable.

2. The centrifugal clutch of claim 1, wherein said centrifugal weight is configured to release said brake device when said centrifugal weight moves outwardly relative to said rotational axis.

3. The centrifugal clutch of claim 1 further comprising:
   a braking surface;
   said brake element coating with said braking surface; and,
   said brake element being configured to lift off said braking surface by said centrifugal weight when said brake device is released.

4. The centrifugal clutch of claim 3, wherein said centrifugal weight is configured to act on said clutch drum via said brake element when said centrifugal clutch is in the engaged state.

5. The centrifugal clutch of claim 3, wherein said brake element is spring mounted radially inward and in a direction toward said braking surface.

6. The centrifugal clutch of claim 3, wherein said brake element has a braking section and a coupling section; said brake section being configured to coact with said braking surface; and, said centrifugal weight being configured to act upon said clutch drum via said coupling section.

7. The centrifugal clutch of claim 6, wherein said centrifugal, weight is configured to press against said brake element when a given rotational speed is exceeded so as to lift said brake element away from said braking surface and, with a further outward movement of said centrifugal weight, said coupling section comps into contact engagement with said clutch drum and said centrifugal weight is connected friction-tight with said clutch drum.

8. The centrifugal clutch of claim 3, wherein said brake device includes a plurality of said brake elements extending over a portion of said braking surface.

9. The centrifugal clutch of claim 8, wherein said brake elements are spring supported by one common spring element.

10. The centrifugal clutch of claim 9, wherein each of said brake elements has an outer periphery; and, said spring element is arranged on said outer periphery of said brake elements.

11. The centrifugal clutch of claim 1, wherein said centrifugal weight is at least partially radially movable relative to said rotational axis; and, said centrifugal weight is spring supported radially inwardly.

12. The centrifugal clutch of claim 1, further comprising a carrier arranged on said drive end of said centrifugal clutch; said carrier having a radially outwardly projecting arm; and, said centrifugal weight being arranged on said arm.

13. The centrifugal clutch of claim 1, comprising a plurality of said centrifugal weights.

14. The centrifugal clutch of claim 13, wherein said plurality of centrifugal weights are arranged in a peripheral direction relative to said rotational axis; and wherein said centrifugal clutch further comprises a plurality of tension springs for resiliently supporting said centrifugal weights; and, each of said tension springs being mounted between two mutually adjacent ones of said centrifugal weights.

15. The centrifugal clutch of claim 1, wherein said centrifugal clutch is mounted in a handheld portable tool including a cutoff machine and brushcutter.

16. The centrifugal clutch of claim 1, wherein said brake element is held on said centrifugal clutch so as to be radially movable.

17. The centrifugal clutch of claim 1, wherein said brake element is radially movably held on said clutch drum of said centrifugal clutch.

18. A centrifugal clutch having a drive end and an output end comprising:
   at least one movably mounted centrifugal weight arranged on said drive end of said centrifugal clutch;
   a clutch drum having a rim and being arranged on said output end of said centrifugal clutch;
   said centrifugal clutch defining a rotational axis and being configured to have an engaged state and a disengaged state;
   a brake device having a released position and an applied position;
   said centrifugal weight holding said brake device in said released position thereof when said centrifugal clutch is in said engaged state thereof;
   said centrifugal weight being at least partially movable in a radial direction with respect to said rotational axis;
   said brake device including at least one brake element; and,
   said brake element being mounted in the radial direction between said centrifugal weight and said rim of said clutch drum.

* * * * *

UNITED STATES PATENT AND TRADEMARK OFFICE
CERTIFICATE OF CORRECTION

PATENT NO. : 8,469,167 B2
APPLICATION NO. : 12/923492
DATED : June 25, 2013
INVENTOR(S) : Sebastian Hanussek, Joerg Elfner and Tim Gegg It is certified that error appears in the above-identified patent and that said Letters Patent is hereby corrected as shown below:

In the Specifications:

In Column 4:
Line 36: delete "section 83," and insert -- section 33, -- therefor.
Line 37: delete "inter" and insert -- inner -- therefor.
Line 42: delete "spend" and insert -- speed -- therefor.

In the Claims:

In Column 5:
Claim 3, Line 33: delete "coating" and insert -- coacting -- therefor.
Claim 7, Line 50: delete "gal," and insert -- gal -- therefor.
Claim 7, Line 54: delete "comps" and insert -- comes -- therefor.

Signed and Sealed this
Twenty-seventh Day of August, 2013

Teresa Stanek Rea
*Acting Director of the United States Patent and Trademark Office*